United States Patent [19]

Nilsson

[11] 4,056,473

[45] Nov. 1, 1977

[54] ROTARY FILTER FOR CONCENTRATING FIBER SUSPENSIONS

[76] Inventor: Bjarne Ivar Nilsson, Takan Pl 2372 B, 460 64 Frandefors, Sweden

[21] Appl. No.: 690,045

[22] Filed: May 25, 1976

[51] Int. Cl.² .......................................... B01D 33/28
[52] U.S. Cl. ................................... 210/331; 210/345
[58] Field of Search ........ 210/390, 391, 396, 406–408, 210/428, 429, 433 R, 459, 77, 345, 324, 331, 327, 332, 333 R, 333 A, 334

[56] References Cited

U.S. PATENT DOCUMENTS

| 1,344,215 | 6/1920 | Sweetland | 210/391 X |
| 2,932,402 | 4/1960 | Logue et al. | 210/407 X |
| 3,080,064 | 3/1963 | Giesse | 210/407 X |
| 3,252,577 | 5/1966 | Anderson | 210/408 X |
| 3,270,888 | 9/1966 | Anderson | 210/408 X |

Primary Examiner—William A. Cuchlinski, Jr.
Attorney, Agent, or Firm—Wenderoth, Lind & Ponack

[57] ABSTRACT

A rotary filter for concentrating fiber suspensions comprises annular disks mounted in parallel and spaced from each other on a motor-driven drum having a lattice-shaped cylindrical wall, the drum being journalled in a vessel for liquid to be filtrated. Each filter disk is composed of sector-shaped filter boxes having at least two opposite filter walls and connected to outlet conduits included in the lattice-shaped wall of the drum. Further, a collecting hopper is stationary inserted in the drum to collect concentrated pulp falling down through the lattice-shaped drum wall from the filter surfaces at the moment such surfaces are in their uppermost positions.

6 Claims, 4 Drawing Figures

ROTARY FILTER FOR CONCENTRATING FIBER SUSPENSIONS

BACKGROUND OF THE INVENTION

The invention relates to a rotary filter for concentrating fibre suspensions, such as diluted pulp. The filter is of the known type which comprises a plurality of annular disks each composed of sector-shaped filter boxes. The disks are mounted in spaced relationship on a common horizontal shaft which is journalled in a vessel intended to contain liquid to be filtered, and the shaft is connected to driving means. Each of the filter boxes has at least two opposite walls made of wire gauze or filter cloth, and the inner end of each box has an outlet for filtrate communicating with a discharge conduit which extends longitudinally through the shaft. The discharge conduits are connected to suction means so that liquid is exhausted from the filter boxes immersed below the liquid level in the vessel. At the same time fibres will get deposited in layers on the outsides of the boxes. Above the liquid level the layers of fibres are removed from the filter surfaces, usually by means of water jets, and the thickened pulp thus released drops into collecting vessels from which it is transported to a vat.

In the known filters of this kind, narrow collecting troughs are stationarily mounted above the rotary shaft within the spaces between the filter disks. However, the dimensioning of such collecting troughs has always involved a problem, particularly due to the requirement that the filter apparatus should be useful for filtering suspensions of different concentrations. If the clearances between the brims of the troughs and the adjacent filter surfaces are made small to secure an effective picking up of the thickened pulp, there might result the risk of jamming of the fibre layers deposited on the filter surfaces, so that the rotation of the rotary shaft is stopped. This may occur particularly when the concentration of the suspension to be filtered is higher than normal. On the other hand, if the clearances are widened to avoid such risk, the picking up of the fibre concentrate will often be less effective.

SUMMARY OF THE INVENTION

The object of the invention is to eliminate these inconveniences. For that purpose, the rotary shaft is designed as a drum having a lattice-shaped cylindrical wall. Longitudinal tubes communicating with the filter boxes are spaced peripherically in the cylindrical wall to serve as outlet conduits for filtrated liquid (filtrate) collected in the boxes. Moreover, a hopper carried by a stationary support is introduced through an open end of the drum in such a way that its inlet end is turned upwardly within the uppermost portion of the cavity of the drum. Thus, the hopper collects concentrated pulp falling down through the lattice-shaped drum wall from filter surfaces at the moment such filter surfaces are in their uppermost positions above the liquid level during the rotation of the drum.

A filter designed in this way will function reliably independent of the thickness of the layers of fibres deposited. Since the spaces between the filter disks are now free, the disks may be placed more closely on the shaft than before, and thereby the apparatus will have an increased capacity for the same given volume of room. Since the collecting hopper has its inlet end located within the uppermost portion of the cavity of the drum, the liquid in the vessel may be kept at a higher level than before, i.e. when using collecting troughs inserted between the filter disks. Thus, the filter area immersed below the liquid level may constitute about 60% of the total filter surface, while in the old apparatus the corresponding value was about 45%. A further advantage of the new apparatus is that the extracted pulp will be more concentrated. Moreover, owing to the absence of external collecting troughs it has been possible to mount radially projecting, preferably elastic scraping members on the peripheral surfaces of the filter disks, such scrapers being adapted to sweep along the bottom of the vessel to prevent the formation thereon of a deposit of heavier fibres.

In another known filter apparatus, the fibre suspension is introduced axially into a rotary filter drum, and a layer of fibres is then deposited on the inside of the cylindrical filter cloth. To collect these concentrated pulp fibres it has been necessary to mount a stationary collecting hopper within the drum. On the other hand, an internal collecting hopper has never before been proposed in connection with rotary disk filters, where the fibres are caused to deposit externally. Probably, nobody has previously seen the advantages of such a device, and in addition to that it is a fact that the combination in question could not be realized without certain fundamental changes of the design of the apparatus. To make possible an internal collecting hopper in a disk filter, the filter shaft must of course be widened into the form of a drum having a diameter sufficiently large to receive the hopper, but, moreover, the cylindrical wall of the drum must be provided with perforations or openings sufficiently large to permit the concentrated pulp to pass through after having been released from the filter surfaces above the liquid level. The inside diameter of the hollow drum should be at least 35%, preferably at least 40% of the outside diameter of the filter disks.

BRIEF DESCRIPTION OF THE DRAWINGS

The invention will be further described hereinafter with reference to the accompanying drawings which show a preferred embodiment of the filter apparatus.

In the drawings.

DETAILED DESCRIPTION OF THE INVENTION

Figure 1:
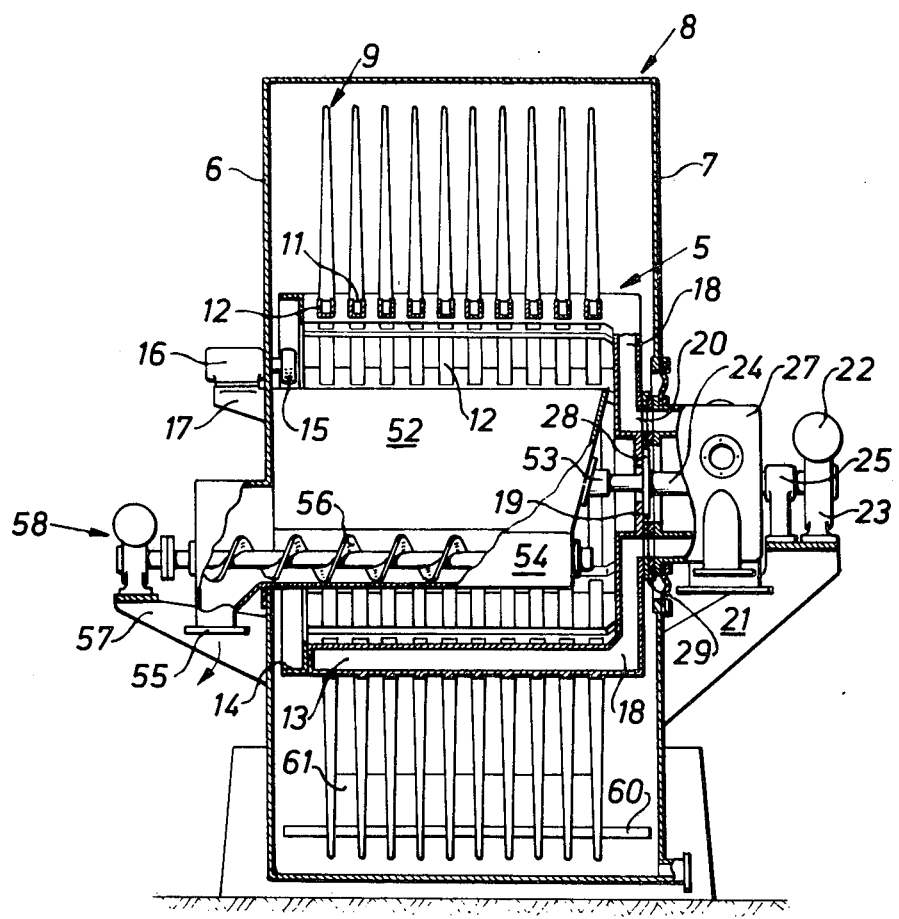
FIGS. 1 and 2 show an axial and a radial section, respectively, through the apparatus, FIG. 1 being a vertical section along line I—I in FIG. 2.

A drum-shaped shaft 5 more closely described in the following extends horizontally between two opposite vertical walls 6 and 7 in a vessel 8 which encloses the filter. The drum 5 carries a plurality of annular filter disks 9 mounted coaxially in spaced relationship. In the known way, each filter disk 9 is composed of several sector-shaped filter boxes 10 mounted to be exchangeable separately. Each such filter box 10 is rather narrow, as seen in the axial direction of the apparatus, and it has two opposite walls consisting of filter cloth and included in the side surfaces of the disk 9. Each such filtering side wall of the box 10 has been formed by covering a frame, not shown, with filter cloth, nowadays usually of synthetic material.

Each filter box 10 has an inner end wall turned to the drum 5 and provided with an opening 11 (FIG. 1)

which communicates with a corresponding opening in a short tube 12 directed peripherically in the wall of the drum 5. Each such tube 12 has its ends fixed to two tubes 13 placed at the inner corners of the box 10 and extending axially of the drum 5. Thus, the cylindrical wall of the drum 5 consists of a lattice formed by axial tubes 13 spaced periphery around the drum and transverse or peripheral tubes 12 spaced axially in longitudinal rows between the tubes 13. Each tube 12 in a longitudinal row has one of its ends in communication with one of the connected longitudinal tubes 13 which thus functions as a common outlet conduit for all filter boxes 10 located in a longitudinal row. As appears from the drawings, all tubes 12 and 13 have preferably square cross section.

At one end of the drum 5 (the left end in FIG. 1) the ends of the longitudinal tubes 13 are closed and welded to a gable ring 14 which is right angled in cross-section and on the interior of which rest two spaced rollers 15. Only one of these rollers 15 is visible in FIG. 1. Each roller 15 is mounted on a horizontal shaft extending through the vessel wall 6 in a direction parallel to the tubes 13 and journalled in a bearing 16 which is supported by a bracket 17 secured to the outside of the wall 6.

At the opposite end of the drum 5 each of the longitudinal tubes 13 communicates with a tube 18 extending radially inwardly. The inner ends of radial tubes 18 are fixes to a hub disk 19, and the mouths of the tubes 18 are turned outwardly from the drum and are located in a common radial plane.

Figure 3:
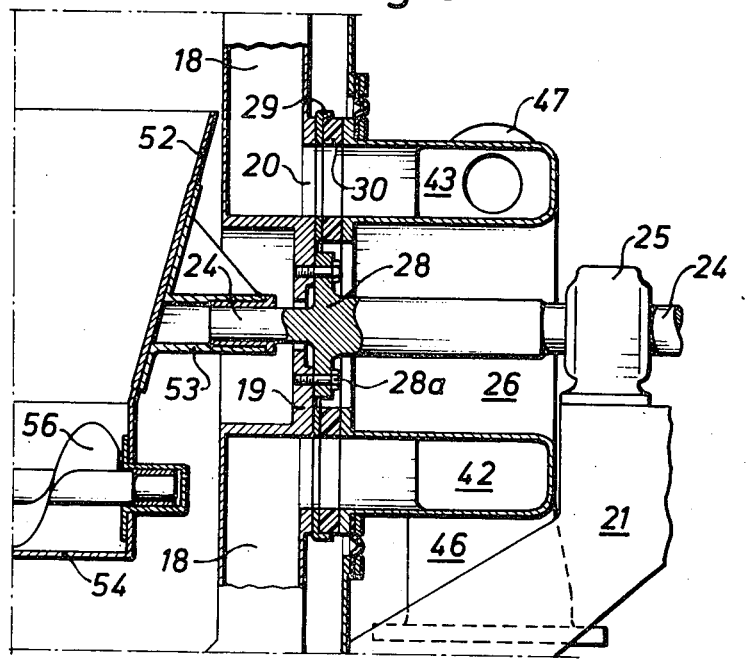

A bracket 21 secured to the outside of the vessel wall 7 carries an electric motor 22 and a pertaining reduction gear 23 which is in driving connection with a shaft 24. The shaft 24 is journalled in a bearing 25 also carried by the bracket 21, and thereafter it passes with a large clearance through a wide opening 26 (FIGS. 3 and 4) in an annular device 27 adapted for locking out the filtrate coming from the filter boxes. Device 27 which is secured to the vessel wall 7, will be more closely described hereinafter. Inside the device 27 the shaft 24 has fixed to it a clutch disk 28 which is connected to the hub disk 19 be means of screws 28a or by other means.

The inner ends of the radial tubes 18 are also connected to an annular disk 29 (FIG. 3) with clearance surrounding the disk 28 in the radial plane of the latter. The disk 29 has openings 20 corresponding to the mouths of the tubes 18, as is indicated by dashed lines in FIG. 4, and its outside is in contact with an equally large annular disk 30 which forms a stationary wall in the annular locking device 27. As appears from FIG. 4, the locking device has an annular cavity divided in four differently large arcuate chambers 36-39 by means of partitions 32-35 which extend substantially radially. By means of openings 40-43 of different sizes in the annular wall 30 contacting the disk 29 chambers 36-39 are in communication with the outlet conduits 18 coming from the filter boxes 10. Moreover, each of the chambers 36-39 is provided with a connection pipe socket 44, 45, 46 and 47, respectively directed radially or possibly tangentially.

Before the function of the locking device is described, it may be mentioned that the suspension to be filtered is supplied to the vessel 8 through an inlet 48 (FIG. 2) provided in one of the side walls. In the opposite side wall the vessel 8 has an outlet 49 with a horizontal overflow edge 50 which maintains a desired liquid level a little above the axis of the rotary filter. As is indicated by an arrow, the filter is intended to rotate anti-clockwise in FIG. 2.

When the filter apparatus is in operation, a moderate negative pressure is usually established within the filter boxes immersed into the liquid, and then the locking device 27 functions in the following way.

Figure 4:
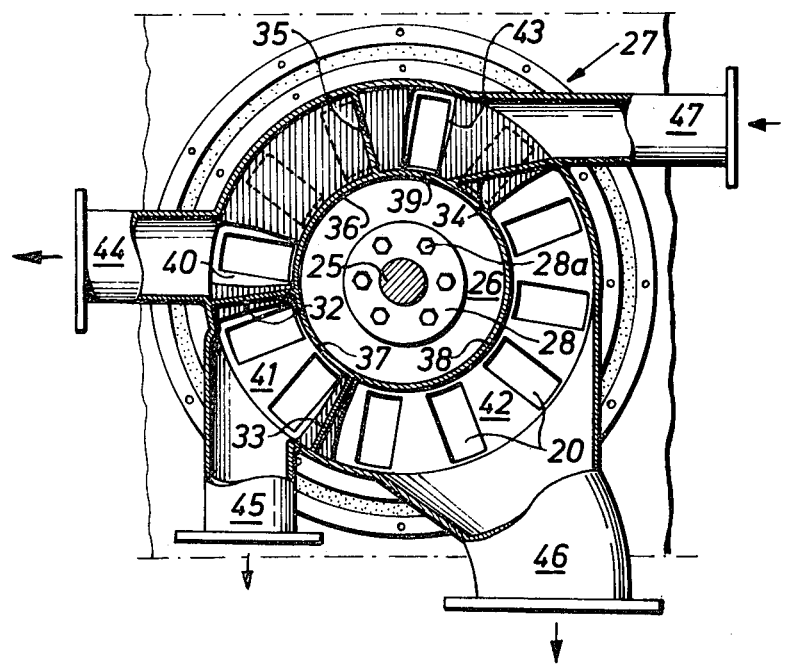
FIGS. 3 and 4 show, on a larger scale, an axial and a radial section, respectively, through a device for discharge of filtrate and supply of compressed air.

The upper left-hand chamber 36 in FIG. 4 receives fibrous liquid through the opening 40, as a filtering layer of fibres has not yet had time to be formed on the filter boxes which at this level begin to move downwardly below the liquid level in the vessel 8. The outlet 44 from the chamber 36 may therefore be connected to a conduit (not shown) which returns the liquid to the vessel 8.

The subsequent chamber 37, as seen in the direction of rotation, will, as a rule, also receive incompletely filtrated liquid through its opening 41, and in such case also the outlet socket 45 may be connected to the return conduit mentioned above. If desired, this connection may be arranged by means of a tipping chute which contributes to the required negative pressure within the filter boxes 10.

The lower right-hand chamber 38 which occupies nearly half the circumference of the annular device 27, has an elongated inlet opening 42 to receive pure filtrate which is then discharged through the outlet 46 and a conduit (not shown) connected thereto.

The upper right-hand chamber 39 is through a smaller opening in communication with the filter boxes which have just been raised above the liquid level and thus are covered with layers of fibres. To facilitate the loosening of such layers from the filter surfaces compressed air may be introduced through the pipe socket 47 so that, in their top positions, the filter boxes are subjected to an internal overpressure.

In these top positions, the filter surfaces are simultaneously subjected to a water spraying by means of sprinklers 51 (FIG. 2) whereby the layers of fibres are effectively removed from the filter surfaces. The concentrated pulp thus released passes through the lattice-shaped wall of the drum 5 and drops down into a hopper 52 mounted within the drum 5 with its wider inlet opening located just below the uppermost portion of the perforated wall of the drum. In the longitudinal direction of the drum 5 the hopper 52 extends below all filter disks 9, and it has one end secured to the vessel wall 6, while its opposite end is supported on the driving shaft 24 which projects into a bushing 53 (FIG. 1) fixed to the gable wall of the hopper 52.

The hopper 52 has a horizontal chute-like bottom portion 54 which passes through the vessel wall 6 and ends in an outlet socket 55 directed downwardly, socket 55 being intended to be connected to a conduit (not shown) for discharge of concentrated pulp. The pulp is discharged by a feed screw 56 inserted in the bottom portion of the hopper 52 and having its outer end connected to a motor-gear unit 58 carried by the bracket 57.

Figure 2:
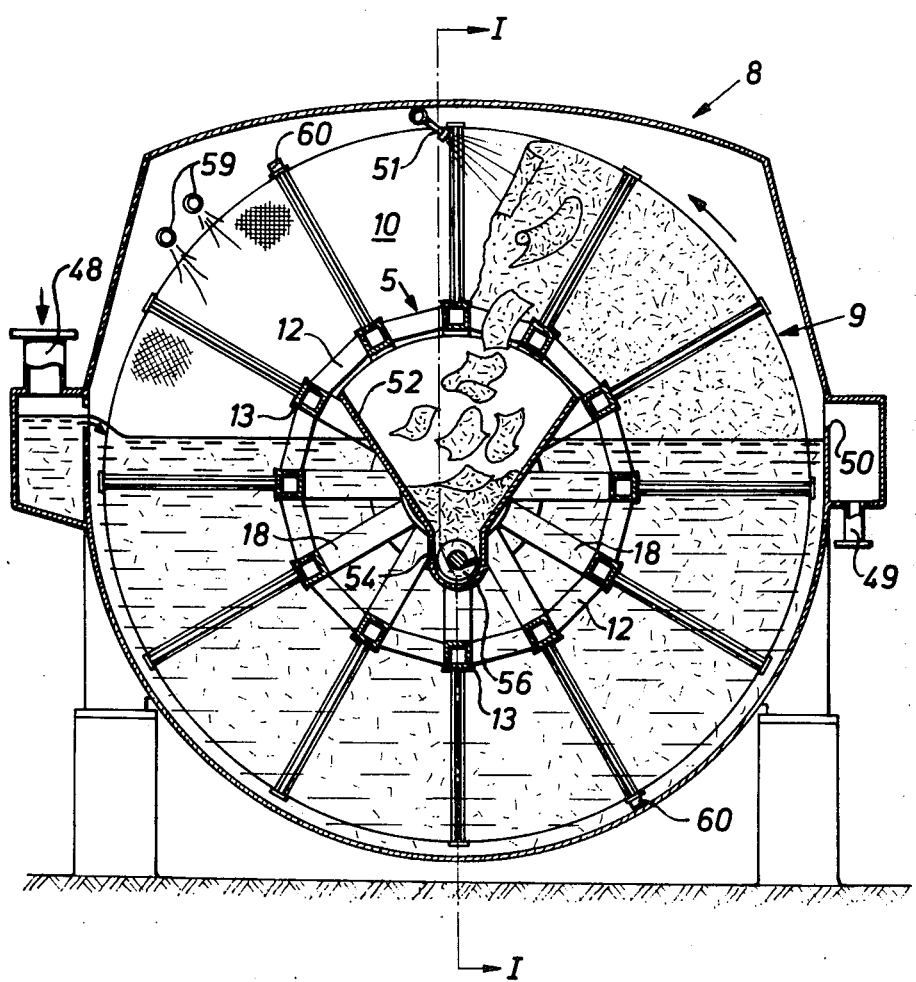

It is also shown in FIG. 2 that further water nozzles 59 may be provided for rinsing the filter boxes 10, before they again move downwardly below the liquid level in the vessel 8.

As appears from FIG. 2, the vessel 8 has a semi-cylindrical bottom wall which surrounds the lower parts of the filter disks 9 with a little clearance only. As already mentioned above, the filter disks 9 may carry scrapers adapted to sweep along the bottom to withdraw a possible deposit. Two such scrapers 60 mounted diametrically opposite each other are indicated in FIG. 2. Preferably the scrapers 60 extend over all filter disks 9 or nearly the entire internal length of the vessel, as may be seen in FIG. 1. When concentrating a relatively thick pulp, the fibres of which are especially inclined to sink to the bottom, it may perhaps be suitable to supplement the scrapers 60 with agitator blades 61 (FIG. 1) inserted between the disks 9 and extending a little distance radially inwardly from the rear edges of the scrapers. If desired, only agitator blades may be used.

What I claim is:

1. In a rotary filter for concentrating fibre suspension and of the type comprising a plurality of annular disks each composed of sector-shaped filter boxes and mounted parallel to each other and in spaced relationship on a common shaft which is journalled in a vessel for containing the liquid to be filtered, means for rotating the shaft, each of said filter boxes having at least two opposite walls made of filter cloth, and an outlet opening for filtrate at the inner end of each filter box, said outlet opening communicating with a longitudinal outlet tube in the shaft, the improvement wherein:

said shaft comprises a drum having a lattice-shaped cylindrical wall, said longitudinal outlet tubes being peripherally spaced about and partially forming said cylindrical wall, and further comprising a collecting hopper positioned within said drum, said hopper extending through an open end of said drum and being supported by a stationary support outside said drum, said hopper having an inlet opening facing upwardly and positioned within the uppermost portion of the interior of said drum, said inlet opening extending along all filter disks carried by said drum to receive concentrated pulp falling down through the lattice-shaped drum wall from those filter surfaces which are at their uppermost positions above the liquid level within said vessel during the rotation of said drum.

2. The improvement claimed in claim 1, wherein said collecting hopper has a chute-like bottom portion containing a motor-driven feed screw.

3. The improvement claimed in claim 1, wherein each said filter box has an inner end connected to a short tube extending peripherally of and partially forming said lattice-shaped wall of said drum, the ends of each said short tube communicating with an adjacent longitudinal outlet tube.

4. The improvement claimed in claim 1, wherein at one end of said drum, said longitudinal outlet tubes are connected to radially inwardly directed tubes having inner ends in communication with a locking device.

5. The improvement claimed in claim 1, wherein said vessel has a semi-cylindrical bottom surrounding the lower parts of said filter disks with slight clearance therebetween, and further comprising scrapers mounted at the outer periphery of said filter disks for scraping along said bottom.

6. The improvement claimed in claim 1, further comprising radially directed agitator blades positioned in the spaces between the outer portions of said filter disks.

* * * * *